(12) United States Patent
Durham et al.

(10) Patent No.: US 10,106,096 B1
(45) Date of Patent: Oct. 23, 2018

(54) ADJUSTABLE SIDE CAR DOOR RACK CARRIER

(71) Applicants: Larry Dean Durham, Hayesville, NC (US); Robert Warren Durham, Mooresville, NC (US)

(72) Inventors: Larry Dean Durham, Hayesville, NC (US); Robert Warren Durham, Mooresville, NC (US)

( * ) Notice: Subject to any disclaimer, the term of this patent is extended or adjusted under 35 U.S.C. 154(b) by 0 days.

(21) Appl. No.: 16/023,334

(22) Filed: Jun. 29, 2018

Related U.S. Application Data

(60) Provisional application No. 62/537,171, filed on Jul. 26, 2017.

(51) Int. Cl.
*B60R 9/02* (2006.01)

(52) U.S. Cl.
CPC ..................... *B60R 9/02* (2013.01)

(58) Field of Classification Search
CPC ........................................................ B60R 9/02
USPC ................................ 224/482, 543, 546, 560
See application file for complete search history.

(56) References Cited

U.S. PATENT DOCUMENTS

| | | | | |
|---|---|---|---|---|
| 1,814,371 A | * | 7/1931 | Desmond | B60R 9/02 224/42.39 |
| 1,919,271 A | * | 7/1933 | Cady | B60R 9/02 224/546 |
| 2,302,300 A | * | 11/1942 | Davies | B60R 9/02 116/DIG. 24 |
| 2,425,629 A | * | 8/1947 | Mayer | B60R 9/02 224/546 |
| 2,635,796 A | * | 4/1953 | Davolt | B60R 9/00 224/42.31 |
| 2,738,882 A | * | 3/1956 | French | B60N 3/002 108/135 |
| 2,797,852 A | * | 7/1957 | Michalski | B60R 9/02 224/546 |
| 3,659,761 A | * | 5/1972 | Wesson | B62J 7/02 224/425 |
| 3,710,999 A | * | 1/1973 | Allen | B60R 9/06 224/321 |
| 4,007,864 A | | 2/1977 | Hreha | |
| 4,108,342 A | * | 8/1978 | Riva | B60P 7/0807 224/318 |
| 4,231,501 A | * | 11/1980 | Goode | B60R 9/12 211/70.5 |
| 4,234,112 A | * | 11/1980 | Gallant | B60R 9/12 211/70.5 |

(Continued)

*Primary Examiner* — Justin Larson
(74) *Attorney, Agent, or Firm* — Dunlap Bennett & Ludwig PLLC; Brendan E. Squire

(57) ABSTRACT

A door rack carrier is a compact, adjustable, easily mountable and removable, temporary system that can be added to the passenger side of most passenger motor vehicles. The door rack carrier allows the user to transport long oversized items for short distances. The door rack carrier is designed to hang on the vehicles doors (front and back) and is adjustable and lockable as required to accommodate different door thicknesses. Each Vehicle Side Carrier (VSC) has tie down cords or straps that will support and hold material to the vertical support column, making it secure. The forward carrier is elevated relative to the rear carrier to provide clearance of the transported items from contact with the turning front wheels of the vehicle.

19 Claims, 5 Drawing Sheets

(56) References Cited

U.S. PATENT DOCUMENTS

| | | | | |
|---|---|---|---|---|
| 4,596,348 A | * | 6/1986 | Stamp | B60R 9/02 |
| | | | | 224/318 |
| 4,607,773 A | * | 8/1986 | Mason | B60R 9/02 |
| | | | | 224/546 |
| 4,850,282 A | * | 7/1989 | Postic | A47B 23/04 |
| | | | | 108/47 |
| 4,942,989 A | * | 7/1990 | Miller | B60R 9/02 |
| | | | | 224/322 |
| 4,944,434 A | | 7/1990 | Hamilton | |
| D317,742 S | * | 6/1991 | Miller | 224/482 |
| 5,029,785 A | * | 7/1991 | Besong, Jr. | B60R 9/02 |
| | | | | 224/325 |
| 5,388,738 A | * | 2/1995 | Russell | B60R 9/02 |
| | | | | 224/482 |
| 6,032,842 A | | 3/2000 | Brickner | |
| 6,412,675 B1 | * | 7/2002 | Pope | B60R 9/02 |
| | | | | 224/325 |
| 7,802,708 B2 | * | 9/2010 | Adamczewski | B60R 9/02 |
| | | | | 224/405 |
| 7,802,709 B1 | * | 9/2010 | Lewis | B60R 9/00 |
| | | | | 224/401 |
| 8,662,501 B1 | * | 3/2014 | Perales | A63B 63/08 |
| | | | | 108/44 |
| 9,487,153 B2 | * | 11/2016 | Ferre-Rangel | B60R 9/08 |
| 9,868,485 B2 | * | 1/2018 | McPheeters | B62J 9/00 |
| 9,926,714 B2 | * | 3/2018 | Cusic | E04H 4/14 |
| 2005/0045683 A1 | * | 3/2005 | Adamczewski | B60P 3/002 |
| | | | | 224/543 |
| 2008/0135592 A1 | | 6/2008 | Corso | |
| 2011/0204110 A1 | * | 8/2011 | Read | B60R 9/065 |
| | | | | 224/560 |

\* cited by examiner

ADJUSTABLE SIDE CAR DOOR RACK CARRIER

CROSS-REFERENCE TO RELATED APPLICATION

This application claims the benefit of priority of U.S. provisional application No. 62/537,171, filed Jul. 26, 2017, the contents of which are herein incorporated by reference.

BACKGROUND OF THE INVENTION

The present invention relates to motor vehicles, and more particularly to external carriers for motor vehicles.

For many individuals, it is difficult to carry lengthy materials, such as construction materials, and other elongate items, with their automobile, particularly for sports cars and compact cars. In many instances, the length of the materials will exceed the interior dimensions of their car. In other circumstances, it may simply be desirable, due to the nature of the item, to carry it on the exterior of the car. While some automobiles may have a roof carrier or support structure, longer length materials are not suited for these carriers.

Side carriers are also known in the art. These carriers attach to the window opening or door of the automobile and allow the user to carry elongate items along the side of the vehicle. However, these systems typically lack sufficient adjustability to accommodate either the carried load, or to the particular motor vehicle. The lack of structural support and protection for the body and body finish of the car are other limitations on their suitability.

As can be seen, there is a need for an apparatus and method engineered for adjustability to fit most vehicles, structural padded supports for protection with comprehensive securing devices.

SUMMARY OF THE INVENTION

One aspect of the present invention includes a door rack carrier for mounting in a window opening of a door of a motor vehicle to carry elongate materials. The door rack carrier includes an external hook member having an inner vertical support arm defining a material holding area for carrying the elongate materials. A suspension arm has a first end and a second end with the elongate hook member attached to a first end thereof. A grip arm is adjustably connected to a second end of the suspension arm to adjust to a width of the car door received between the external hook member and the grip arm. An exterior door pad mount is carried by the external hook member, has a protective pad carried thereon to protect an outer surface of the door.

The exterior door pad mount is adjustable about one or more axes, relative an exterior surface of the door. A plurality of apertures may be defined in a spaced apart relation along the suspension arm. A locking pin is received in the grip arm and a selected one of the plurality apertures to provide a desired spacing between the external hook member and the grip arm.

In some embodiments, a protective pad covers a door contacting surface of one or more of the grip arm and the suspension arm. In certain embodiments, the external hook member includes: an inner vertical support arm disposed proximal to the car door; a horizontal support arm extending laterally outwardly from the inner vertical support arm; and an outer vertical support arm extending upwardly from an end of the horizontal support arm.

In preferred embodiments, the carrier includes a forward external hook member and an aft external hook member. A bottom end of the materials holding area of the forward external hook is elevated relative to a bottom end of the materials holding area of the aft external hook member.

In yet other embodiments, the exterior door pad mount is vertically adjustable along the inner support arm, for adjustment in a first axis. The exterior door pad mount may also be rotationally adjusted about the inner support arm for adjustment in a second axis. The exterior door pad mount may also tilt to accommodate for adjustment about a third axis. An O-ring may be adjustably positioned along a vertical length of the inner support arm to position the door pad mount at a selected vertical position.

In some embodiments, the door rack carrier may also include an interior safety strap having a first end that is configured to attach to the second end of the suspension arm, and a protrusion defined at a second end. The interior safety strap is adapted to be routed between a bottom edge of the door panel and a door frame member subjacent to the door panel.

A binding cord may be provided to constrain the carried materials. A first end of the binding cord attached to one of the upper end of the inner vertical support arm or the first end of the suspension arm. Likewise, a fender strap may include a first loop be formed by adjustment of a first buckle around a bulbous item, that is configured to be received between one of a hood lid or a trunk lid and a fender. A second loop is adapted to receive end portions of the supported materials.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
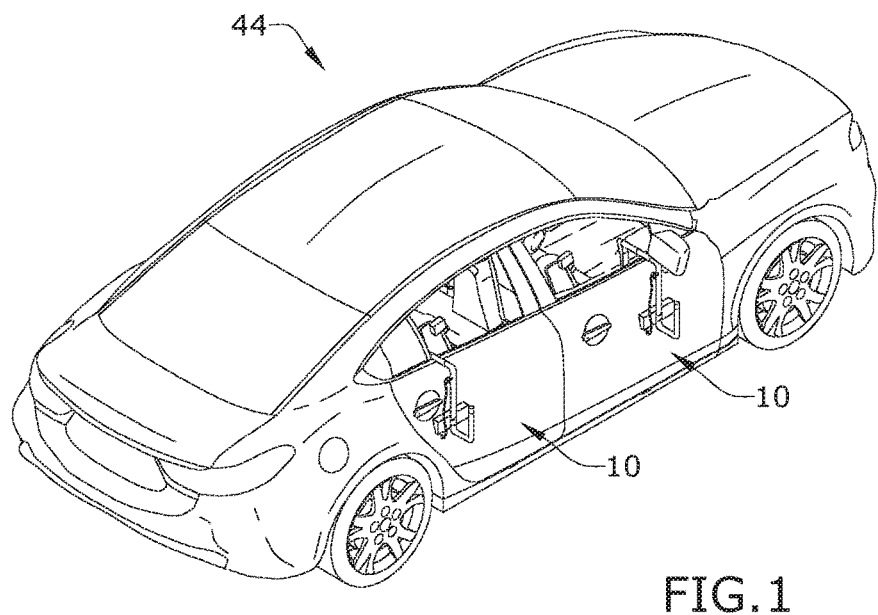
FIG. 1 is a perspective view of the door rack carrier shown in use applied to a motor vehicle.
Figure 2:
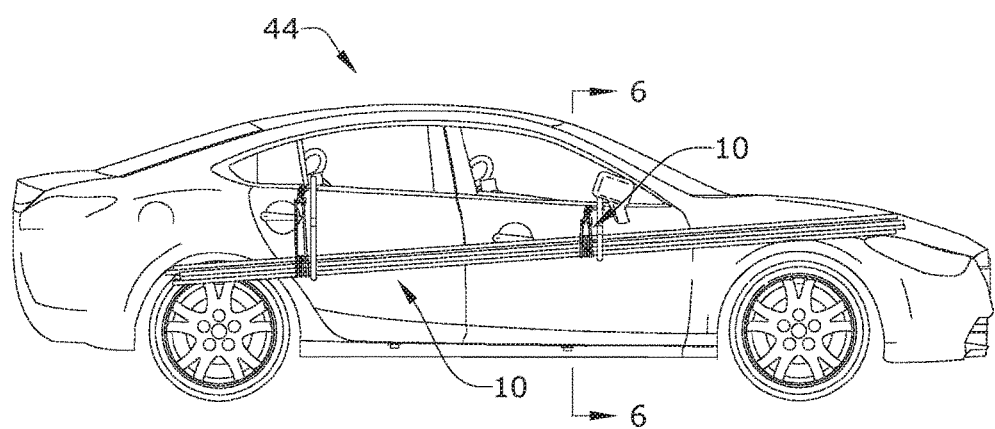
FIG. 2 is a side view of the door rack carrier holding an elongate material.
Figure 3:
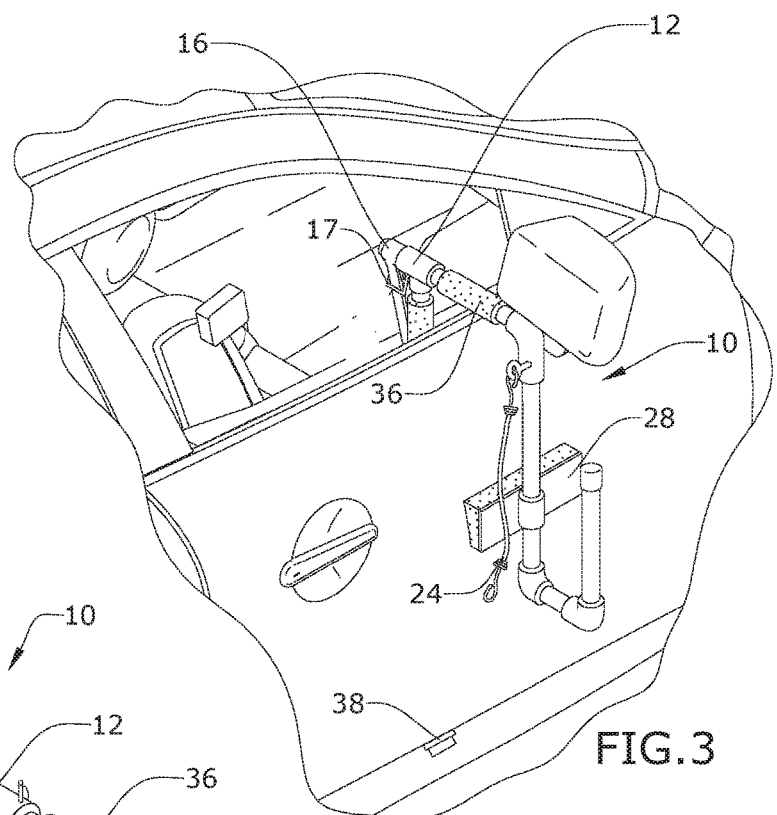
FIG. 3 is a zoomed in perspective view of the door rack carrier.
Figure 4:
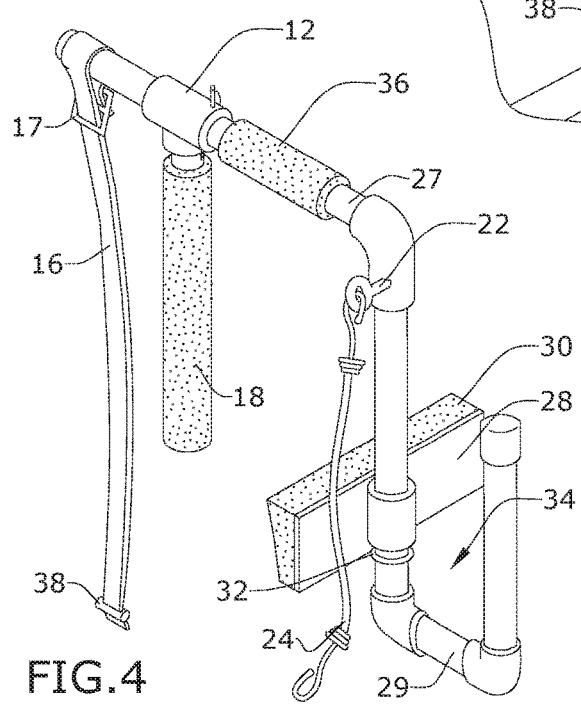
FIG. 4 is a detailed perspective view of the door rack carrier.

Broadly, embodiments of the present invention an apparatus and method for carrying elongate members on a side of an automobile. As seen in reference to FIG. 1, an automotive door rack carrier 10 according to aspects of the present invention is illustrated suspended from a window opening of an automobile 44. The door rack carrier 10 is adjustably configured to support and carry an elongate load, such as seen in reference to FIG. 2, where the elongate load may include construction materials, such as lumber, pipes, and the like.

As seen in reference to FIGS. 3-6, the door rack carrier 10 includes an external J-hook member having an inner vertical support arm 26, disposed proximal to the car door, a horizontal support arm 29, extending laterally outwardly from the inner vertical support arm 26, and an outer vertical support arm 31 extending upwardly from an end of the horizontal support arm 29. The inner support arm 26, horizontal support arm 29, and outer vertical support arm 31, defining a material holding area 34 between the respective arms. The length of a forward external hook member is preferably formed so that it is shorter than that a rear external hook member, such that the materials carried therein will slant up at a forward end of the vehicle so as to avoid contact of the materials with the front wheel when turning.

The external hook member is coupled to a first end of a suspension arm 27 that extends substantially orthogonal to the external hook member. The suspension arm 27 is configured to extend through the window opening of the car and be suspended from a top edge of the car door. A protective pad 36 is provided to protect the top edge of the car door from marring of the finish of the door.

A grip arm 12 is adjustably connected to a second end of the suspension arm 27 so that the width of the car door is received between the inner vertical support arm 26 and a lower end of the grip arm 12. A protective pad 18 may be provided around the grip arm 12 to protect the interior finishes of the car door. The protective pad 18 may be provided by a resilient material to provide a padding as well as a frictional gripping force against the interior trim of the car door. The suspension arm 27 may include a plurality of apertures 20 disposed in a spaced apart relation along a length of the second end of the suspension arm 27. A locking pin 14 may then be received in one of the plurality of apertures 20 to adjustably secure the grip arm 12 to the suspension arm 27.

An exterior door pad mount 28 is adjustably carried by the inner vertical support arm 26. The exterior door pad mount 28 is fitted with a protective pad 30, to protect the finish of the exterior door panel. The exterior door pad mount 28 may adjusted in a plurality of axes to accommodate for a universal fit for the contours and dimensions of an exterior door panel. In the embodiment shown, the exterior door pad mount 28 is vertically adjustable along the exterior support arm 26, for adjustment in a first axis. The exterior door pad mount 28, may also be rotationally adjusted about the inner support arm 26 for adjustment in a second axis. The door pad mount 28 may also be tilted to accommodate for adjustment about a third axis. In the embodiment shown, an O-ring may be adjustably positioned along the vertical length of the inner support arm 28 to support the exterior door pad mount 28 at a desired vertical position when mounting the external hook member to the door.

Figure 6:
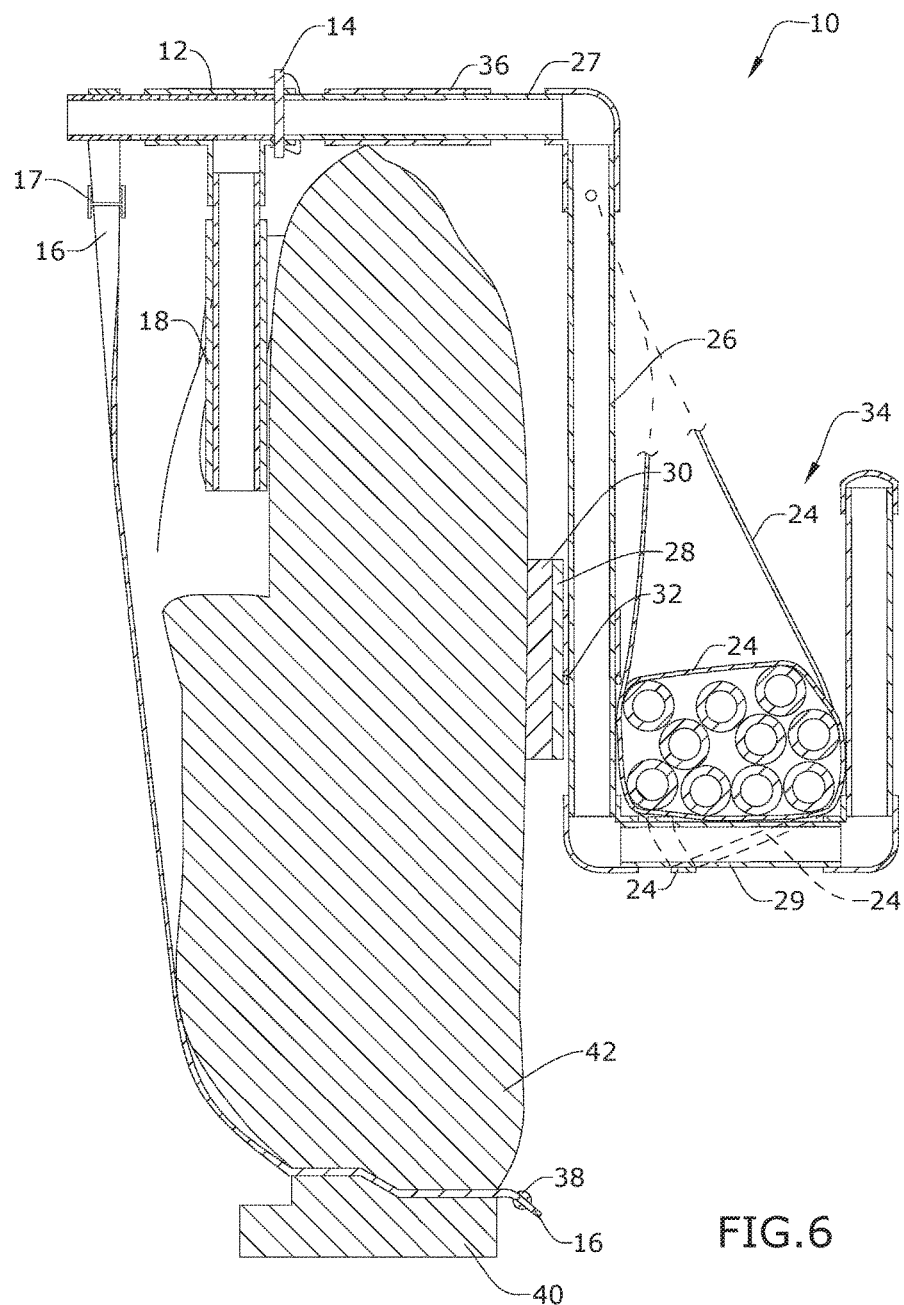
FIG. 6 is a section view of the door rack carrier, taken along line 6-6 of FIG. 2.

As best seen in reference to FIG. 6, an interior safety strap 16 has a first end that is configured to attach to the second end of the suspension arm 27. A second end of the interior safety strap 16 is fitted with a locking pin 38, dowel, or bulbous protrusion so that the second end of the interior safety strap 16 may be routed between a bottom edge of the door panel 42 and a door runner or frame member 40 subjacent to the door panel 42. A buckle 17, or tightening mechanism is provided to permit tightening of the interior safety strap 16 to secure the second end of the suspension arm 27 to facilitate leveling and retention of the external hook member to the door. The interior safety strap 16 also provides for distribution of a retaining force to the lower end of the door 42 to counter the loading forces experienced by the carrier during transport of materials.

Figure 5:
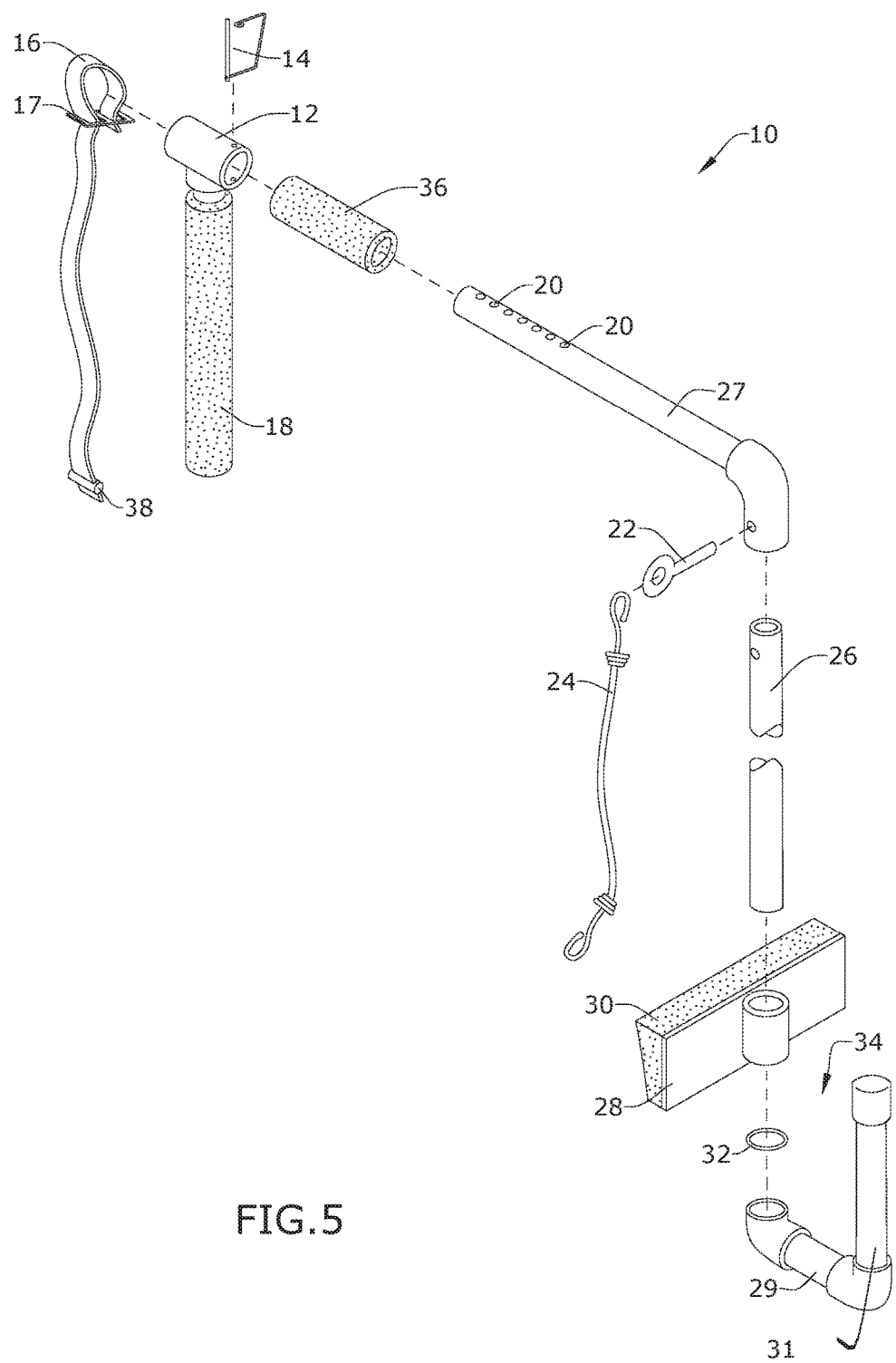
FIG. 5 is an exploded view of the door rack carrier.

As best seen in reference to FIGS. 5 and 6, a binding cord, or binding strap 24 may be provided to constrain the carried materials and tether the carried materials to the external support member may be attached to one of the upper end of the inner vertical support arm 26 or the first end of the suspension arm 27. In the embodiment shown, the binding strap 24 may be secured to an eye loop 22 and wrapped around the carried materials.

The present invention as described herein, is a compact, adjustable, easily mountable and removable, temporary system that can be added to the passenger side of most vehicles. Thus allowing the user to transport long oversized items for short distances. The door rack carrier contains a pair of adjustable, mechanical devices. When added to the side of a vehicle, (optionally with a short hook member in the front and the loner hook member in the back), it allows for hauling over-sized product/materials, such as lumber, trim or plastic pipe that is up to 16 feet long and in some cases up to lengths of 20 feet. The system is designed to hang on the vehicles doors (front and back) and is adjustable and lockable as required to accommodate different door thicknesses. Each Vehicle Side Carrier (VSC) has tie down cords or straps that will support and hold material to the vertical support column, making it secure. An eye-bolt is attached to the vertical support column to attach and tie down cords and or straps.

Figure 7:
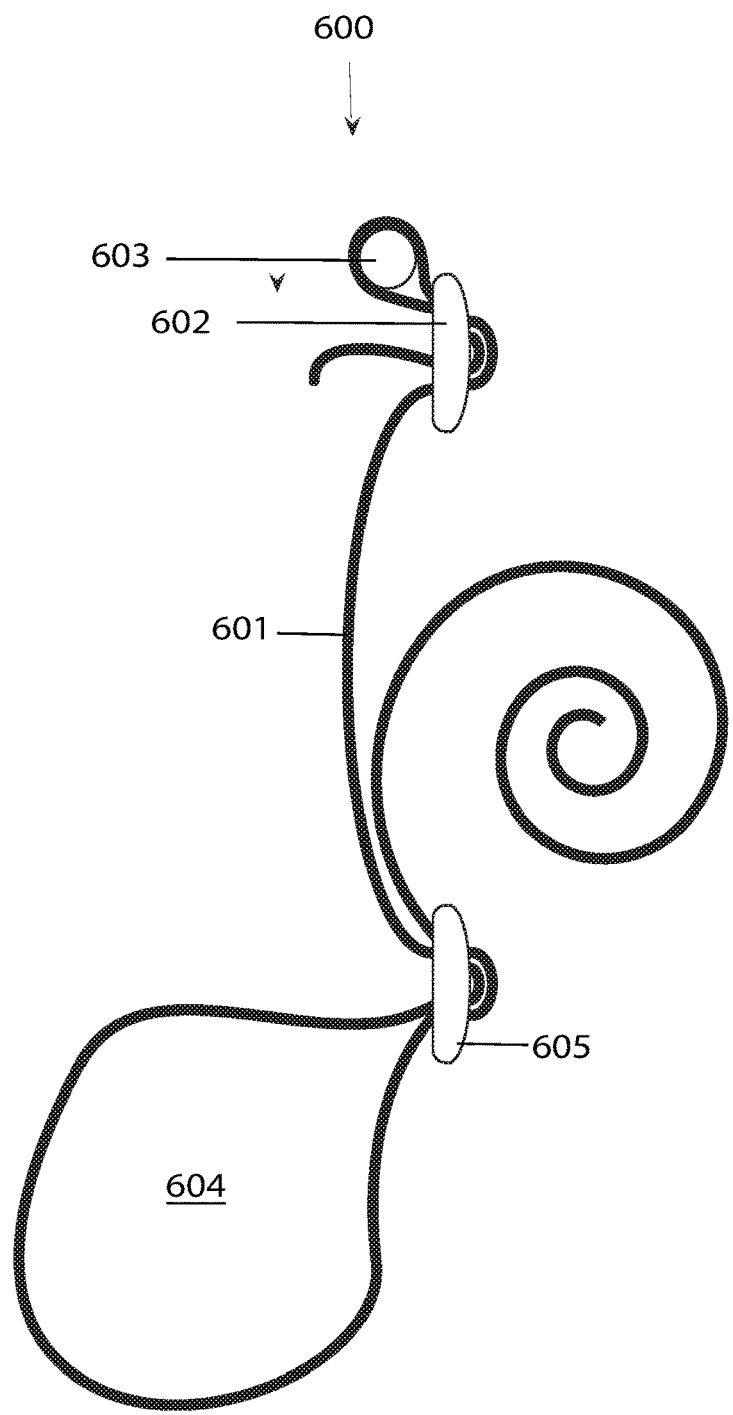
FIG. 7 is a side elevation view of a hood/trunk securement strap.

In other aspects of the invention, the carrier may also include one or more fender and hood/trunk straps 600, as seen in reference to FIG. 7. The hood straps 600 are longer in length, but otherwise similar in construction and operation to the interior safety strap 16. The hood straps include a length of a nylon, or other woven strap material 601. A first loop may be formed by adjustment of a first buckle 602 around a dowel 603 or other bulbous item. As with the interior safety strap 16, the strap 601 is routed between a trunk or hood lid and its associated fender to retain looped dowel 603 within the hood or trunk compartment. A second end of the strap 601 is defined in a second, load supporting loop 603, which receives end portions of the supported materials. The load supporting loop is adjusted with a buckle 605 to cinch the materials within the loop 603. The first buckle 602 is used to adjust the length of the strap 601 to stabilize long materials and to protect vehicle body. Once the straps 600 and the looped dowel 603 are in place, then the Hood/Trunk lid is closed to retain the dowel 603ts beneath the hood/trunk and the straps are tightened around material and an optional protection tube, if needed, may be placed on the strap between 602 & 605, to protect the finish of the fenders.

It should be understood, of course, that the foregoing relates to exemplary embodiments of the invention and that modifications may be made without departing from the spirit and scope of the invention as set forth in the following claims.

What is claimed is:

1. A door rack carrier for mounting in a window opening of a door of a motor vehicle to carry elongate materials, comprising:

an external hook member having an inner vertical support arm defining a material holding area for carrying the elongate materials;

a suspension arm having a first end and a second end with the external hook member attached to a first end thereof;

an interior safety strap having a first end that is configured to attach to the second end of the suspension arm, a protrusion defined at a second end of the interior safety strap, wherein the interior safety strap is adapted to be routed between a bottom edge of a door panel and a door frame member subjacent to the door panel;

a grip arm adjustably connected to a second end of the suspension arm to adjust to a width of the car door received between the external hook member and the grip arm, when attached to the motor vehicle; and an exterior door pad mount carried by the external hook member, the exterior door pad mount having a protective pad carried thereon to protect an outer surface of the door.

2. The door rack carrier of claim 1, wherein the exterior door pad mount is adjustable about one or more axes, relative to the door.

3. The door rack carrier of claim 2, further comprising:
a plurality of apertures defined in a spaced apart relation along the suspension arm; and
a locking pin received in the grip arm and a selected one of the plurality apertures to provide a desired spacing between the external hook member and the grip arm.

4. The door rack carrier of claim 3, further comprising:
a protective pad covering a door contacting surface of one or more of the grip arm and the suspension arm.

5. The door rack carrier of claim 4, wherein the external hook member comprises:
an inner vertical support arm disposed proximal to the car door;
a horizontal support arm extending laterally outwardly from the inner vertical support arm; and
an outer vertical support arm extending upwardly from an end of the horizontal support arm.

6. The door rack carrier of claim 1, further comprising:
a forward external hook member; and
an aft external hook member,
wherein a bottom end of the materials holding area of the forward external hook is elevated relative to a bottom end of the materials holding area of the aft external hook member.

7. The door rack carrier of claim 5, wherein the exterior door pad mount is vertically adjustable along the inner support arm, for adjustment in a first axis.

8. The door rack carrier of claim 5, wherein the exterior door pad mount, is rotationally adjusted about the inner support arm for adjustment in a second axis.

9. The door rack carrier of claim 8, wherein the exterior door pad mount tilts to accommodate for adjustment about a third axis.

10. The door rack carrier of claim 8, further comprising:
an O-ring be adjustably positioned along a vertical length of the inner support arm.

11. The door rack carrier of claim 1, further comprising:
a binding cord to constrain the carried materials, a first end of the binding cord attached to one of the upper end of the inner vertical support arm or the first end of the suspension arm.

12. The door rack carrier of claim 1, further comprising:
a fender strap having a first loop be formed by adjustment of a first buckle around a bulbous item, configured to be received between one of a hood lid or a trunk lid and a fender; a second loop, adapted to receive end portions of the supported materials.

13. A door rack carrier for mounting in a window opening of a door of a motor vehicle to carry elongate materials, comprising:
an external hook member having an inner vertical support arm defining a material holding area for carrying the elongate materials;
a suspension arm having a first end and a second end with the elongate hook member attached to a first end thereof;
a grip arm adjustably connected to a second end of the suspension arm to adjust to a width of the car door received between the external hook member and the grip arm, when attached to the motor vehicle;
an exterior door pad mount carried by the external hook member, the exterior door pad mount having a protective pad carried thereon to protect an outer surface of the door, and
an O-ring carried on the inner support arm, wherein the O-ring is adjustably positioned along a vertical length of the inner support arm to adjust a vertical height of the exterior door pad.

14. The door rack carrier of claim 13, wherein the exterior door pad mount is adjustable about one or more axes, relative to the door.

15. The door rack carrier of claim 13, further comprising:
a plurality of apertures defined in a spaced apart relation along the suspension arm; and
a locking pin received in the grip arm and a selected one of the plurality apertures to provide a desired spacing between the external hook member and the grip arm.

16. The door rack carrier of claim 13, wherein the external hook member comprises:
an inner vertical support arm disposed proximal to the car door;
a horizontal support arm extending laterally outwardly from the inner vertical support arm; and
an outer vertical support arm extending upwardly from an end of the horizontal support arm.

17. The door rack carrier of claim 13, further comprising:
a forward external hook member; and
an aft external hook member,
wherein a bottom end of the materials holding area of the forward external hook is elevated relative to a bottom end of the materials holding area of the aft external hook member.

18. The door rack carrier of claim 13, further comprising:
an interior safety strap having a first end that is configured to attach to the second end of the suspension arm, and
a protrusion defined at a second end, wherein the interior safety strap is adapted to be routed between a bottom edge of the door panel and a door frame member subjacent to the door panel.

19. The door rack carrier of claim 13, further comprising:
a fender strap having a first loop be formed by adjustment of a first buckle around a bulbous item, configured to be received between one of a hood lid or a trunk lid and a fender; a second loop, adapted to receive end portions of the supported materials.

* * * * *